United States Patent
Suzuki (10) Patent No.: US 12,444,310 B2
(45) Date of Patent: Oct. 14, 2025

(54) SERVER APPARATUS, SYSTEM, AND OPERATING METHOD OF SYSTEM

(71) Applicant: TOYOTA JIDOSHA KABUSHIKI KAISHA, Toyota (JP)

(72) Inventor: Shotaro Suzuki, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 444 days.

(21) Appl. No.: 17/937,577

(22) Filed: Oct. 3, 2022

(65) Prior Publication Data

US 2023/0114882 A1 Apr. 13, 2023

(30) Foreign Application Priority Data

Oct. 7, 2021 (JP) ................. 2021-165728

(51) Int. Cl.
*G08G 5/34* (2025.01)
*G05D 1/00* (2006.01)
*G06Q 50/40* (2024.01)
*G08G 5/76* (2025.01)

(52) U.S. Cl.
CPC ............... *G08G 5/34* (2025.01); *G05D 1/102* (2013.01); *G06Q 50/40* (2024.01); *G08G 5/76* (2025.01)

(58) Field of Classification Search
CPC .... G08G 5/0039; G08G 5/0091; G06Q 50/40; G05D 1/102
See application file for complete search history.

(56) References Cited

U.S. PATENT DOCUMENTS

| | | |
|---|---|---|
| 10,789,567 B1 * | 9/2020 | Ur .................. G08G 5/0069 |
| 2017/0039667 A1 | 2/2017 | Kim |
| 2019/0212735 A1 * | 7/2019 | Fujiwara ............. G05D 1/0212 |
| 2019/0226862 A1 * | 7/2019 | Shaukat ................ G07C 5/008 |

FOREIGN PATENT DOCUMENTS

| | | | |
|---|---|---|---|
| JP | 2013-002844 A | 1/2013 | |
| JP | 2013-114407 A | 6/2013 | |
| JP | 2017-33568 A | 2/2017 | |
| JP | 2019-516611 A | 6/2019 | |
| JP | 2019-119586 A | 7/2019 | |
| WO | WO-2017197316 A1 * | 11/2017 | ........... B64C 27/20 |

* cited by examiner

*Primary Examiner* — Luke Huynh
(74) *Attorney, Agent, or Firm* — Oliff PLC (57) ABSTRACT

A server apparatus includes a communication interface and a controller configured to communicate using the communication interface. The controller instructs an aircraft to fly along a flight path for the aircraft to transport a passenger from a departure point to a final destination when a condition of the flight path is good, and instructs the aircraft to fly along an alternative flight path to an alternative destination and executes a dispatch process to dispatch a vehicle to transport the passenger from the alternative destination to the final destination when the condition of the flight path is poor.

20 Claims, 8 Drawing Sheets

FIG. 8

SERVER APPARATUS, SYSTEM, AND OPERATING METHOD OF SYSTEM

CROSS-REFERENCE TO RELATED APPLICATION

This application claims priority to Japanese Patent Application No. 2021-165728, filed on Oct. 7, 2021, the entire contents of which are incorporated herein by reference.

TECHNICAL FIELD

The present disclosure relates to a server apparatus, a system, and an operating method of a system.

BACKGROUND

Various means have been proposed to assist in searching for routes for vehicles and the like that transport passengers. For example, Patent Literature (PTL) 1 discloses technology for reporting information regarding a route between a departure point and a destination.

CITATION LIST

Patent Literature

PTL 1: JP 2013-2844 A

SUMMARY

Passenger transport means, such as vehicles and aircraft, have room for improvement in operational efficiency.

The present disclosure provides a server apparatus and the like that enable improvement in operational efficiency of passenger transport means.

A server apparatus according to the present disclosure includes:

a communication interface; and
a controller configured to communicate using the communication interface, wherein
the controller instructs an aircraft to fly along a flight path for the aircraft to transport a passenger from a departure point to a final destination when a condition of the flight path is good, and instructs the aircraft to fly along an alternative flight path to an alternative destination and executes a dispatch process to dispatch a vehicle to transport the passenger from the alternative destination to the final destination when the condition of the flight path is poor.

A system according to the present disclosure includes a server apparatus, an aircraft, and a vehicle configured to communicate with each other, wherein the server apparatus instructs the aircraft to fly along a flight path for the aircraft to transport a passenger from a departure point to a final destination when a condition of the flight path is good, and instructs the aircraft to fly along an alternative flight path to an alternative destination and executes a dispatch process to dispatch a vehicle to transport the passenger from the alternative destination to the final destination when the condition of the flight path is poor,
the aircraft flies according to instruction from the server apparatus, and
the vehicle travels based on the dispatch process.

An operating method of a system according to the present disclosure is an operating method of a system including a server apparatus, an aircraft, and a vehicle configured to communicate with each other, the operating method including:

instructing, by the server apparatus, the aircraft to fly along a flight path for the aircraft to transport a passenger from a departure point to a final destination when a condition of the flight path is good, and instructing the aircraft to fly along an alternative flight path to an alternative destination and executing a dispatch process to dispatch a vehicle to transport the passenger from the alternative destination to the final destination when the condition of the flight path is poor;
flying, by the aircraft, according to instruction from the server apparatus; and
traveling, by the vehicle, based on the dispatch process.

According to the server apparatus and the like in the present disclosure, the operational efficiency of passenger transport means can be improved.

DETAILED DESCRIPTION

Embodiments are described below.

Figure 1:
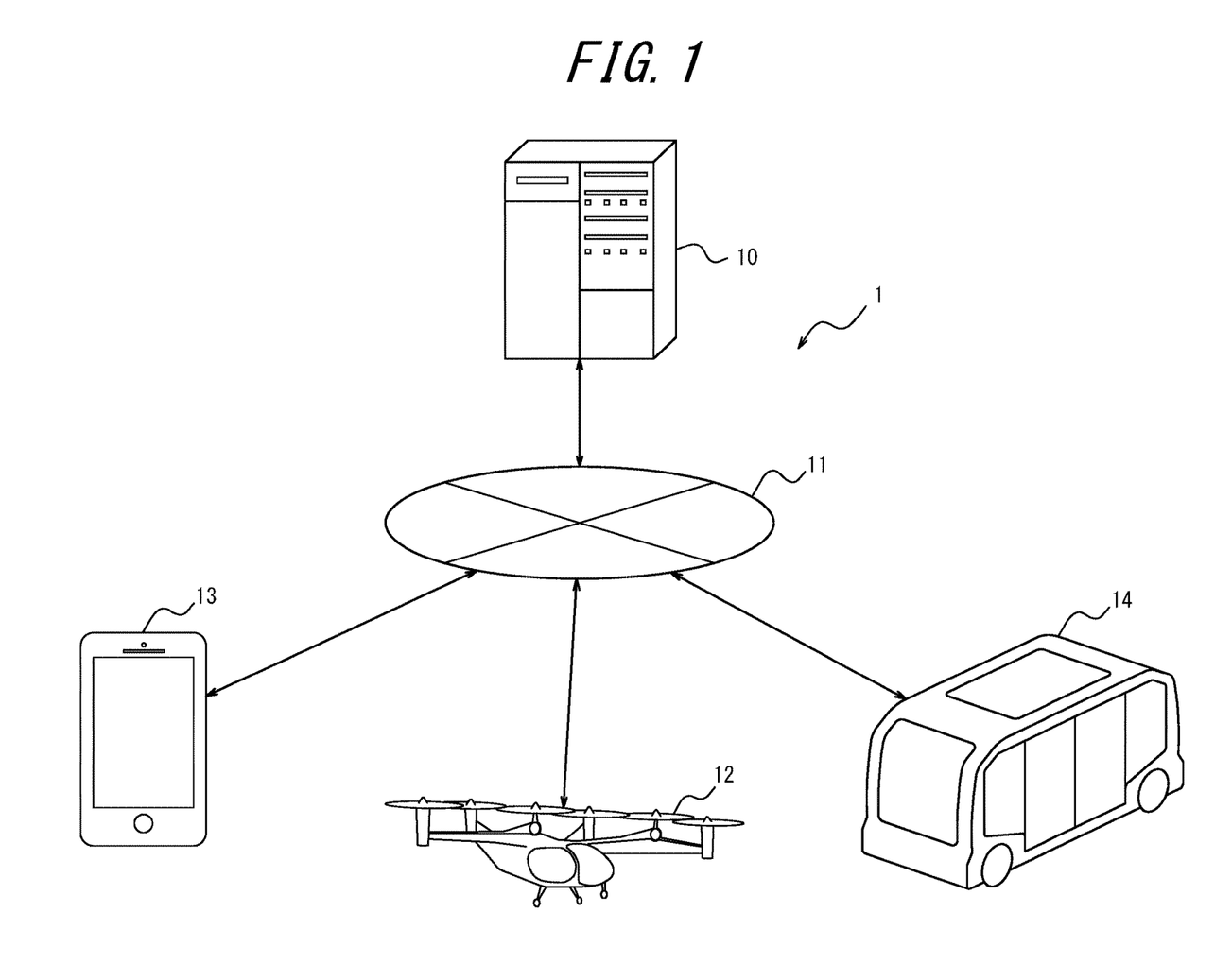
FIG. 1 is a diagram illustrating an example configuration of an operation management system.

FIG. 1 is a diagram illustrating a configuration example of an operation management system according to an embodiment. An operation management system 1 is a system that supports operation management for aircraft and vehicles that transport passengers on demand. The operation management system 1 includes one or more each of a server apparatus 10, an aircraft 12, a terminal apparatus 13, and a vehicle 14 communicably connected to each other via a network 11.

The server apparatus 10 is, for example, a server computer that belongs to a cloud computing system or other computing system and functions as a server that implements various functions. The server apparatus 10 is used by a provider that provides operational services with the aircraft 12 and the vehicle 14.

The aircraft 12 has a cabin similar in size to a passenger car, capable of accommodating one or more occupants, and a mechanism including electric rotors for generating lift and thrust. The aircraft 12 is an aircraft piloted at least partially by visual flight rules (VFR), such as an electric vertical take-off and landing (eVTOL) aircraft. The aircraft 12 may be piloted by instrument flight rules (IFR). The aircraft 12 is provided with communication functions and information processing functions and is connected to the network 11 via a mobile communication network.

The terminal apparatus 13 is an information processing apparatus provided with communication functions, is used by a passenger aboard the aircraft 12 or the vehicle 14, and performs various information communication and information processing. The terminal apparatus 13 is, for example, an information processing terminal such as a smartphone or a tablet terminal.

The vehicle 14 is provided with communication functions and information processing functions and is connected to the network 11 via a mobile communication network. The vehicle 14 is a bus that allows passengers to board and alight at desired locations by reservation. The vehicle 14 may be driven by a driver, or driving may be automated at any level, such as one of Level 1 to Level 5 defined by the Society of Automotive Engineers (SAE). The vehicle 14 may also be a battery electric vehicle (BEV) or a hybrid electric vehicle (HEV) that uses battery power for at least part of the energy for driving.

The network 11 may, for example, be the Internet or may include an ad hoc network, a local area network (LAN), a metropolitan area network (MAN), other networks, or any combination thereof.

In the present embodiment, the server apparatus 10 of the operation management system 1 instructs the aircraft 12 to fly along a flight path for the aircraft 12 to transport a passenger from a departure point to a final destination when a condition of the flight path is good, and instructs the aircraft 12 to fly along an alternative flight path to an alternative destination and executes a dispatch process to dispatch the vehicle 14 to transport the passenger from the alternative destination to the final destination when the condition of the flight path is poor. The feasibility of safe flight depends on weather conditions, particularly in the case of the aircraft 12 flying by VFR. In a case in which bad weather is foreseen on the flight path of the aircraft 12 or near the final destination, the server apparatus 10 guides the aircraft 12 to an alternative destination to avoid areas of bad weather for the sake of safety. At the same time, the server apparatus 10 dispatches the vehicle 14, which is less susceptible to the effects of bad weather than the aircraft 12, to the alternative destination to transport the passengers from the alternative destination to the final destination. In this way, operation to the final destination continues, without being cancelled, using the aircraft 12 and the vehicle 14 as passenger transport means. This contributes to convenience for passengers and avoids opportunity losses, such as refunds due to cancellations, for the provider of the operation service. In other words, the operational efficiency of the passenger transport means can be improved.

Figure 2:
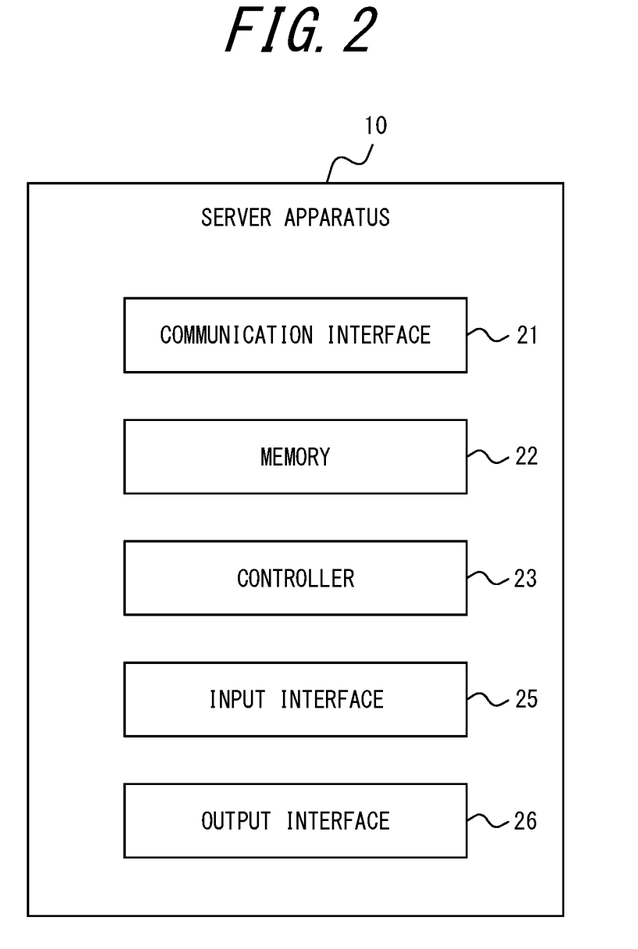
FIG. 2 is a diagram illustrating an example configuration of a server apparatus.

FIG. 2 illustrates an example configuration of the server apparatus 10. The server apparatus 10 includes a communication interface 21, a memory 22, a controller 23, an input interface 25, and an output interface 26. The server apparatus 10 is, for example, a single computer. The server apparatus 10 may be two or more computers that are communicably connected to each other and operate in cooperation. In this case, the configuration illustrated in FIG. 2 can be arranged among two or more computers as appropriate.

The communication interface 21 includes one or more interfaces for communication. The interface for communication is, for example, a LAN interface. The communication interface 21 receives information to be used for the operations of the server apparatus 10 and transmits information obtained by the operations of the server apparatus 10. The server apparatus 10 is connected to the network 11 by the communication interface 21 and communicates information with the aircraft 12, the terminal apparatus 13, or the vehicle 14 via the network 11.

The memory 22 includes, for example, one or more semiconductor memories, one or more magnetic memories, one or more optical memories, or a combination of at least two of these types, to function as main memory, auxiliary memory, or cache memory. The semiconductor memory is, for example, random access memory (RAM) or read only memory (ROM). The RAM is, for example, Static RAM (SRAM) or Dynamic RAM (DRAM). The ROM is, for example, electrically erasable programmable ROM (EEPROM). The memory 22 stores information to be used for the operations of the server apparatus 10 and information obtained by the operations of the server apparatus 10.

The controller 23 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 23 executes information processing related to operations of the server apparatus 10 while controlling components of the server apparatus 10.

The input interface 25 includes one or more interfaces for input. The interface for input is, for example, a physical key, a capacitive key, a pointing device, a touch screen integrally provided with a display, or a microphone that receives audio input. The input interface 25 accepts operations to input information used for operation of the server apparatus 10 and transmits the inputted information to the controller 23.

The output interface 26 includes one or more interfaces for output. The interface for output is, for example, a display or a speaker. The display is, for example, a liquid crystal display (LCD) or an organic electro-luminescent (EL) display. The output interface 26 outputs information obtained by the operations of the server apparatus 10.

The functions of the server apparatus 10 are realized by a processor included in the controller 23 executing a control program. The control program is a program for causing a computer to function as the server apparatus 10. Some or all of the functions of the server apparatus 10 may be realized by a dedicated circuit included in the controller 23. The control program may be stored on a non-transitory recording/storage medium readable by the server apparatus 10 and be read from the medium by the server apparatus 10.

Figure 3:
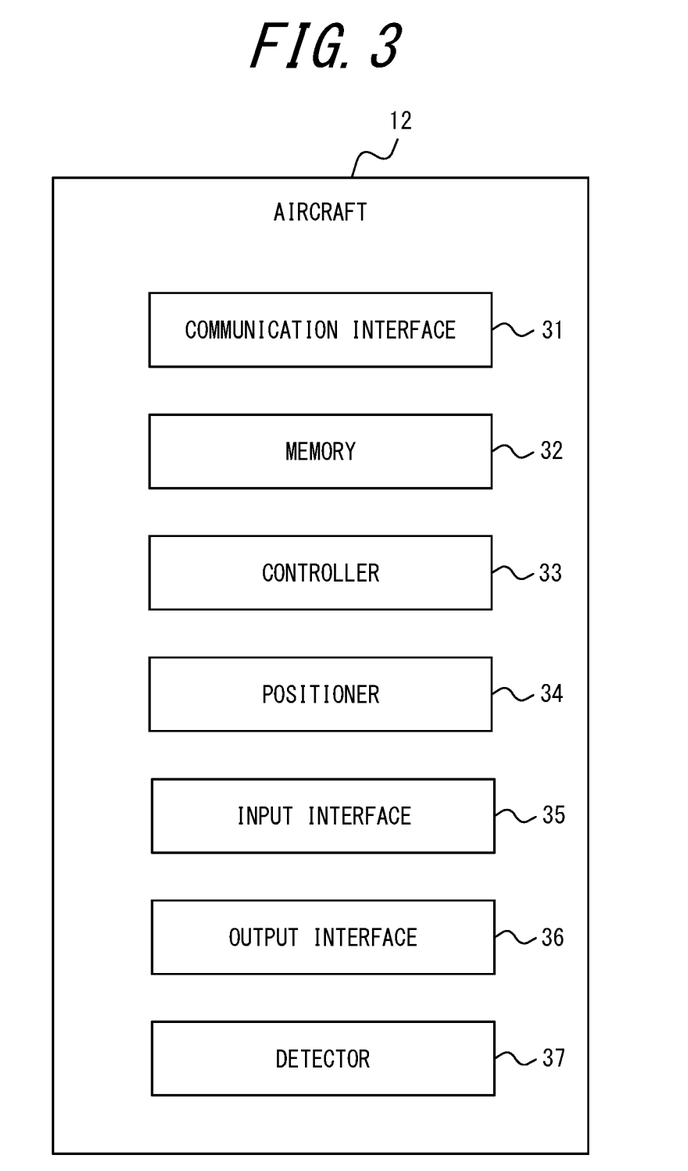
FIG. 3 is a diagram illustrating an example configuration of an aircraft.

FIG. 3 illustrates an example configuration of the aircraft 12 related to the present embodiment. The aircraft 12 includes a communication interface 31, a memory 32, a controller 33, a positioner 34, an input interface 35, an output interface 36, and a detector 37. One or more of these may be configured as a single control apparatus, or each component may be connected via an on-board network in the aircraft 12 to enable communication of information. The control apparatus may also be configured by a personal computer including a tablet terminal, a smartphone terminal, a navigation apparatus, or the like.

The communication interface 31 includes one or more interfaces for communication. Examples of the interface for communication include an interface corresponding to mobile communication standards, such as Long Term Evolution (LTE), 4th Generation (4G), or 5th Generation (5G). The communication interface 31 receives information to be used for the operations of the controller 33 and transmits information obtained by the operations of the controller 33.

The controller 33 connects to the network 11 using the communication interface 31 through a mobile communication base station and communicates information with the server apparatus 10 via the network 11.

The memory 32 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores information to be used for the operations of the controller 33 and information obtained by the operations of the controller 33.

The controller 33 includes one or more processors, one or more dedicated circuits, or a combination thereof. Examples of the processor include a general purpose processor such as a CPU and a dedicated processor dedicated to specific processing. The dedicated circuit is, for example, an FPGA or an ASIC. The controller 33 executes information processing pertaining to operations of the aircraft 12.

The positioner 34 includes one or more Global Navigation Satellite System (GNSS) receivers. The GNSS includes, for example, at least one of Global Positioning System (GPS), Quasi-Zenith Satellite System (QZSS), BeiDou, Global Navigation Satellite System (GLONASS), and Galileo. The positioner 34 acquires positional information for the aircraft 12. The positioner 34 may include a sensor such as an acceleration sensor or a gyro sensor, for measuring the position of the aircraft 12 by autonomous navigation.

The input interface 35 includes one or more interfaces for input. The interface for input is, for example, a physical key, a capacitive key, a pointing device, a touch screen integrally provided with a display, or a microphone that receives audio input. The interface for input may further include a camera or integrated circuit (IC) card reader that captures images or image codes. The input interface 35 accepts operations for inputting information to be used in the operations of the controller 33 and transmits the inputted information to the controller 33.

The output interface 36 includes one or more interfaces for output. The interface for output is, for example, a display or a speaker. The display is, for example, an LCD or an organic EL display. The output interface 36 outputs information obtained by the operations of the controller 33.

The detector 37 includes one or more sensors, or interfaces with sensors, that detect the condition or operation of various components in the aircraft 12 and transmits information indicating the results of detection by the sensors to the controller 33. The sensors include sensors that detect the condition or operation of the drive mechanism, the power supply, and the like. The sensors also include wind speed sensors, wind direction sensors, air temperature sensors, air pressure sensors, humidity sensors, illumination sensors, rainfall sensors, cameras, and other sensors that detect conditions in the environment external to the aircraft 12.

The functions of the controller 33 are realized by a processor included in the controller 33 executing a control program. The control program is a program for causing the processor to function as the controller 33. Some or all of the functions of the controller 33 may be realized by a dedicated circuit included in the controller 33.

The controller 33 controls each of the communication interface 31, the memory 32, the positioner 34, the input interface 35, the output interface 36, and the detector 37 while exchanging various information with these components and also presents various information necessary for piloting the aircraft 12 to the pilot via the output interface 36.

Figure 4:
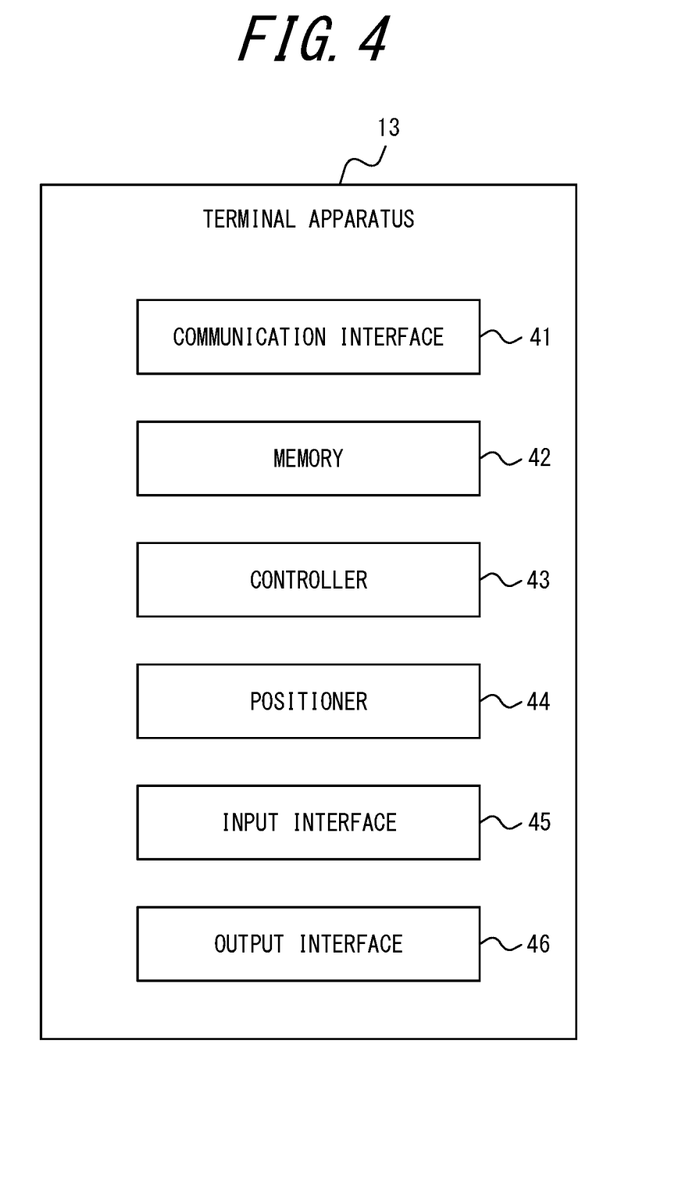
FIG. 4 is a diagram illustrating an example configuration of a terminal apparatus.

FIG. 4 is a diagram illustrating a configuration of the terminal apparatus 13. The terminal apparatus 13 is, for example, an information processing apparatus such as a smartphone, a tablet terminal, or the like. The terminal apparatus 13 includes a communication interface 41, a memory 42, a controller 43, a positioner 44, an input interface 45, and an output interface 46.

The communication interface 41 includes a communication module compliant with a wired or wireless LAN standard, a module compliant with a mobile communication standard such as LTE, 4G, or 5G, or the like. The terminal apparatus 13 connects to the network 11 via a nearby router apparatus or mobile communication base station using the communication interface 41 and communicates information with the server apparatus 10 and the like over the network 11.

The memory 42 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 42 functions as, for example, a main memory, an auxiliary memory, or a cache memory. The memory 42 stores information to be used for the operations of the controller 43 and information obtained by the operations of the controller 43.

The controller 43 has one or more general purpose processors such as CPUs or micro processing units (MPUs) or one or more dedicated processors that are dedicated to specific processing. Alternatively, the controller 43 may have one or more dedicated circuits such as FPGAs or ASICs. The controller 43 is configured to perform overall control of the operations of the terminal apparatus 13 by operating according to the control/processing programs or operating according to operation procedures implemented in the form of circuits.

The controller 43 then transmits and receives various types of information to and from the server apparatus 10 and the like via the communication interface 41 and executes the operations according to the present embodiment.

The positioner 44 includes one or more GNSS receivers. GNSS includes, for example, GPS, QZSS, BeiDou, GLONASS, and/or Galileo. The positioner 44 acquires positional information for the terminal apparatus 13.

The input interface 45 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 45 accepts operations for inputting information to be used in the operations of the controller 43 and transmits the inputted information to the controller 43.

The output interface 46 includes one or more interfaces for output. The interface for output is, for example, a display or a speaker. The display is, for example, an LCD or an organic EL display. The output interface 46 outputs information obtained by the operations of the controller 43.

The functions of the controller 43 are realized by a processor included in the controller 43 executing a control program. The control program is a program for causing the processor to function as the controller 43. Some or all of the functions of the controller 43 may be realized by a dedicated circuit included in the controller 43.

Figure 5:
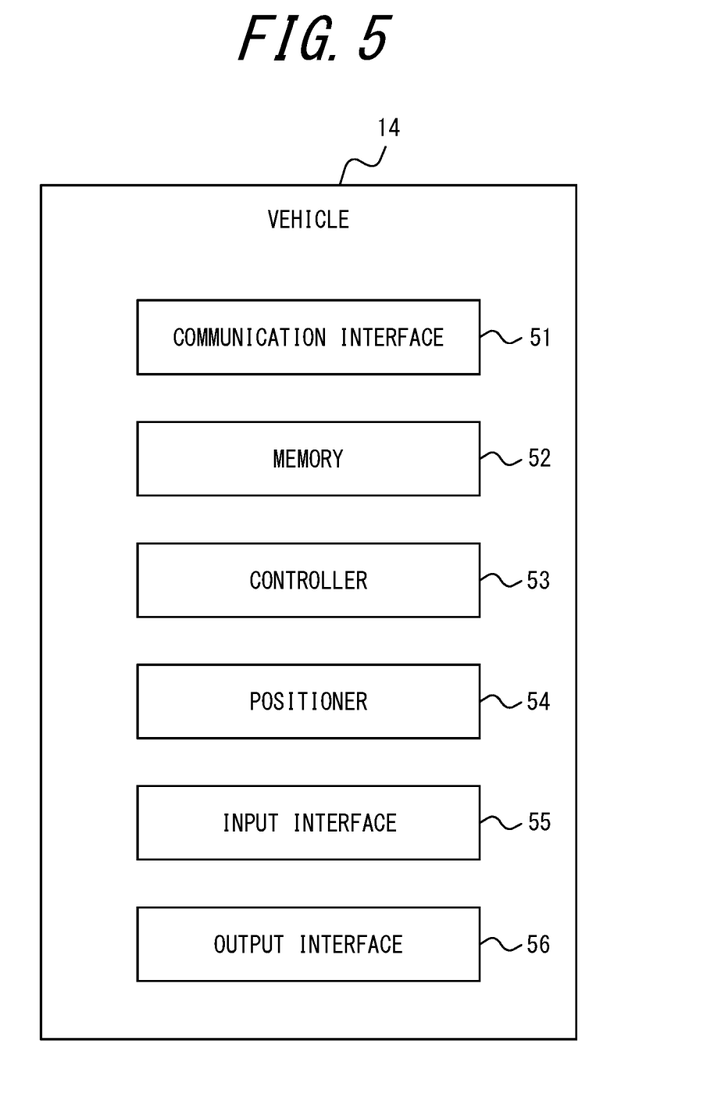
FIG. 5 is a diagram illustrating an example configuration of a vehicle.

FIG. 5 illustrates a configuration example of the vehicle 14. The vehicle 14 includes a communication interface 51, a memory 52, a controller 53, a positioner 54, an input interface 55, and an output interface 56. One or more of these may be configured as a single control apparatus, or each component may be connected via an in-vehicle network compliant with a standard such as controller area network (CAN) to enable communication of information. The control apparatus may also be configured by a personal computer including a tablet terminal, a smartphone terminal, a navigation apparatus, or the like.

The communication interface 51 includes one or more interfaces for communication. Examples of the interface for communication include an interface corresponding to mobile communication standards, such as LTE, 4G, or 5G. The communication interface 51 receives information to be used for the operations of the controller 53 and transmits information obtained by the operations of the controller 53. The controller 53 connects to the network 11 using the communication interface 51 through a mobile communication base station and communicates information with the server apparatus 10 and the like via the network 11.

The memory 52 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 52 functions as, for example, a main memory, an auxiliary memory, or a cache memory. The memory 52 stores information to be used for the operations of the controller 53 and information obtained by the operations of the controller 53.

The controller 53 includes one or more processors, one or more dedicated circuits, or a combination thereof. Examples of the processor include a general purpose processor such as a CPU and a dedicated processor dedicated to specific processing. The dedicated circuit is, for example, an FPGA or an ASIC. The controller 53 executes information processing related to operations of the vehicle 14 while controlling the components of the controller 53.

The positioner 54 includes one or more GNSS receivers. GNSS includes, for example, GPS, QZSS, BeiDou, GLONASS, and/or Galileo. The positioner 54 acquires positional information for the vehicle 14.

The input interface 55 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 55 accepts operations for inputting information to be used in the operations of the controller 53 and transmits the inputted information to the controller 53.

The output interface 56 includes one or more interfaces for output. The interface for output is, for example, a display or a speaker. The display is, for example, an LCD or an organic EL display. The output interface 56 outputs information obtained by the operations of the controller 53.

The functions of the controller 53 are realized by a processor included in the controller 53 executing a control program. The control program is a program for causing the processor to function as the controller 53. Some or all of the functions of the controller 53 may be realized by a dedicated circuit included in the controller 53.

The controller 53 controls each of the communication interface 51, the memory 52, the positioner 54, the input interface 55, and the output interface 56 while exchanging various information with these components and also controls the operation of the vehicle 14. At the time of operating the vehicle 14, the controller 53 controls the operation of the vehicle 14 by presenting various information necessary for the operation of the vehicle 14 to the driver via the output interface 56 and/or by controlling the automatic operation of the vehicle 14.

Figure 6:
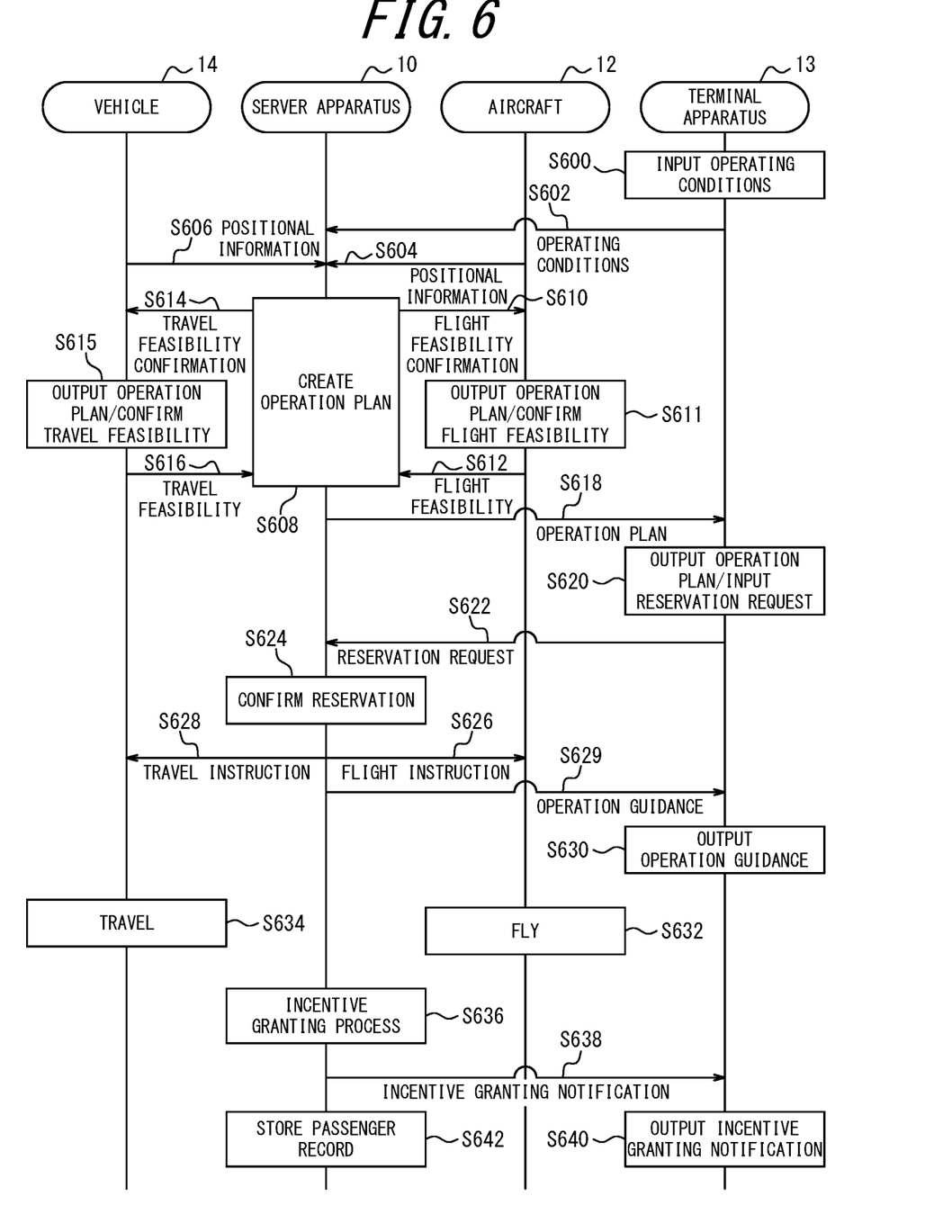
FIG. 6 is a sequence diagram illustrating an example of operations of the operation management system.

FIG. 6 is a sequence diagram illustrating the operation procedures of the operation management system 1. FIG. 6 illustrates the steps in the coordinated operation of the server apparatus 10, the aircraft 12, the terminal apparatus 13, and the vehicle 14. The steps pertaining to the various information processing by the server apparatus 10, the aircraft 12, the terminal apparatus 13, and the vehicle 14 in FIG. 6 are performed by the respective controllers 23, 33, 43, 53. The steps pertaining to transmitting and receiving various types of information to and from the server apparatus 10, the aircraft 12, the terminal apparatus 13, and the vehicle 14 are performed by the respective controllers 23, 33, 43, 53 transmitting and receiving information to and from each other via the respective communication interfaces 21, 31, 41, 51. In the server apparatus 10, the aircraft 12, the terminal apparatus 13, and the vehicle 14, the respective controllers 23, 33, 43, 53 appropriately store the information that is transmitted and received in the respective memories 22, 32, 42, 52. Furthermore, the controllers 23, 33, 43, 53 accept input of various information by the respective input interfaces 25, 35, 45, 55 and output various information by the respective output interfaces 26, 36, 46, 56.

The operation procedures in FIG. 6 are the procedures performed when a passenger operates the terminal apparatus 13 to receive the operation service provided by the aircraft 12 and the vehicle 14. Although an example of the operation procedures for one aircraft 12, one terminal apparatus 13, and one vehicle 14 are illustrated, the procedures in FIG. 6 may be performed in conjunction by the server apparatus 10 and two or more of each of the aircraft 12, terminal apparatus 13, and vehicle 14.

In step S600, the terminal apparatus 13 accepts input of operating conditions from the passenger. The operating conditions include information such as the number of passengers, the departure point, the desired time of departure, the final destination, and the desired time of arrival. The controller 53 controls the output interface 56 to display an operating condition input screen and controls the touch panel or the like that forms the input interface 45 to accept information inputted by the passenger.

In step S602, the terminal apparatus 13 transmits information on the operating conditions to the server apparatus 10. The server apparatus 10 receives the information transmitted from the terminal apparatus 13.

In step S604, the server apparatus 10 receives positional information for the aircraft 12 from the aircraft 12. For example, the aircraft 12 transmits the positional information to the server apparatus 10 at any appropriate period (for example, a period of a few seconds). Alternatively, the server apparatus 10 may request the positional information from the aircraft 12 and the aircraft 12 may transmit the positional information to the server apparatus 10 in response to the request. Identification information for the aircraft 12 is included with the positional information. This enables the server apparatus 10 to associate the identification information and positional information for each aircraft 12, even in a case in which a plurality of aircraft 12 exists.

In step S606, the server apparatus 10 receives the positional information for the vehicle 14 from the vehicle 14. For example, the vehicle 14 transmits the positional information to the server apparatus 10 at any appropriate period (for example, a period of a few seconds). Alternatively, the server apparatus 10 may request the positional information from the vehicle 14 and the vehicle 14 may transmit the positional information to the server apparatus 10 in response to the request. Identification information for the vehicle 14 is included with the positional information. This enables the server apparatus 10 to associate the identification information and positional information for each vehicle 14, even in a case in which a plurality of vehicles 14 exists.

In step S608, the server apparatus 10 creates an operation plan. The detailed operation procedures for the controller 23 in step S608 are illustrated in FIG. 7.

Figure 7:
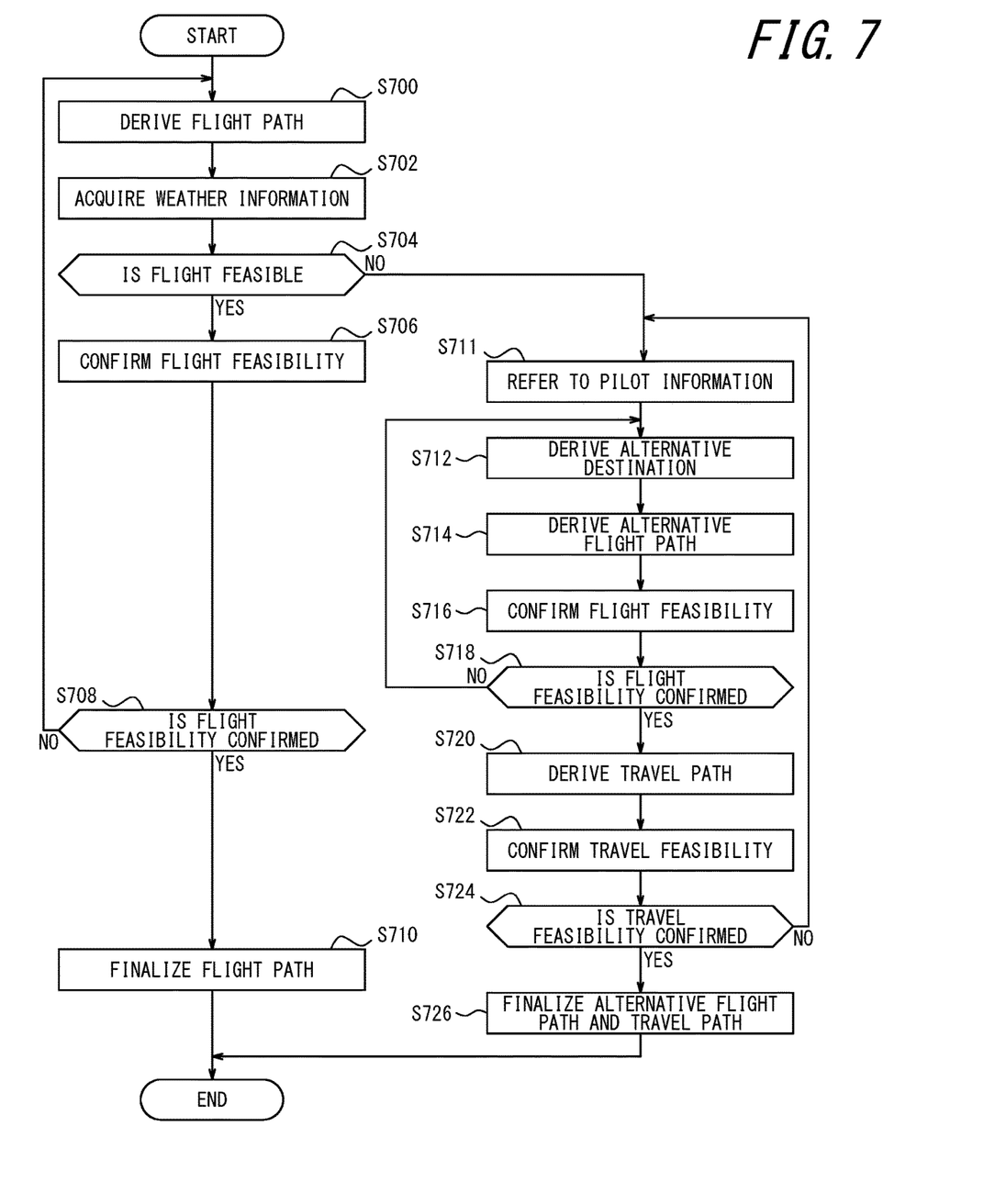
FIG. 7 is a flowchart illustrating an example of operations of the server apparatus.
Figure 8:
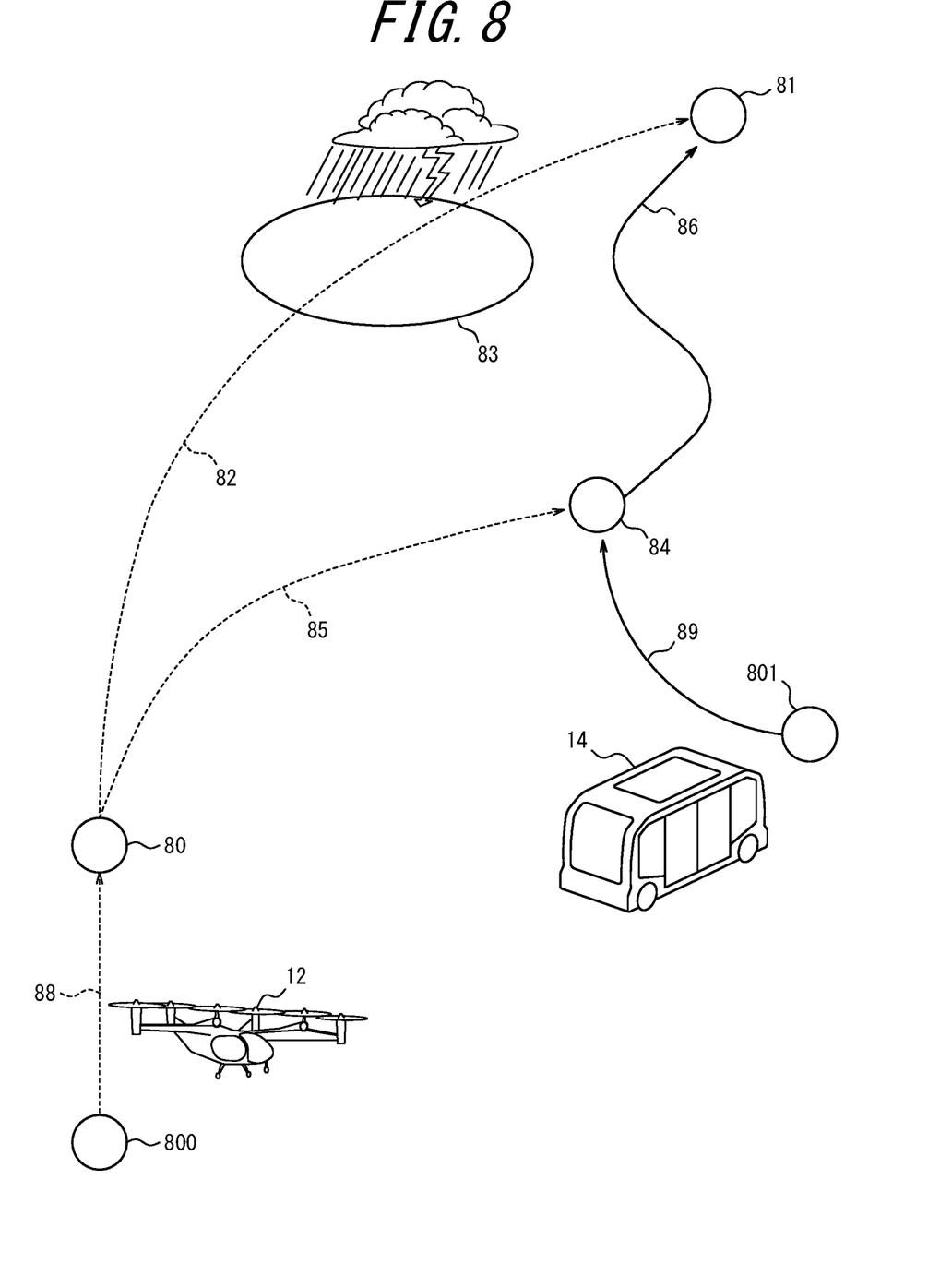
FIG. 8 is a diagram illustrating an example form of operation management.

FIG. 7 is a flowchart illustrating the operation procedures for the controller 23 in the server apparatus 10. FIG. 8 is a diagram schematically illustrating the flight path of the aircraft 12 and the travel path of the vehicle 14. FIG. 7 and FIG. 8 are used to describe the detailed operation procedures for the controller 23 in step S608.

In step S700, the controller 23 derives a flight path 82 from the departure point 80 to the final destination 81 using any appropriate algorithm. The controller 23 derives the safest and shortest flight path, for example, using map information and information on the presence or absence of other aircraft routes, various regulations, and the like. Information on the topography of the ground surface, the status of installations, and the like is included in the map information. The various information used to derive the flight path is stored in advance in the memory 22 or obtained from other servers via the communication interface 21 and is used by the controller 23. In a case in which the server apparatus 10 communicates with a plurality of aircraft 12, the controller 23 selects the aircraft 12 whose current position 800 is closest to the departure point 80 and derives the flight path 82.

In step S702, the controller 23 acquires weather information for the flight path 82. The controller 23 obtains the weather information via the communication interface 21, for example, from a server that distributes weather information. The controller 23 extracts weather information for the area through which the derived flight path 82 passes.

In step S704, the controller 23 determines whether the aircraft 12 can fly along the flight path 82 based on the weather along the flight path 82, i.e., whether the condition of the flight path 82 is good. The controller 23 determines, based on the weather information, if bad weather, such as storms, will occur in the area through which the flight path 82 passes. The condition of the flight path 82 is determined to be poor in a case in which bad weather will occur and to be good in a case in which bad weather will not occur. In a case in which the aircraft 12 flies along the flight path 82, for example, the controller 23 determines if the weather at the time the aircraft 12 arrives at each point on flight path 82 will be bad weather. The arrival time of the aircraft 12 is calculated from the standard flight speed of the aircraft 12, which is set appropriately, and the travel distance. It can be determined if the weather will be bad based on whether the wind speed, rainfall, and the like meet appropriately set criteria, or whether the weather forecast calls for bad weather. In a case in which bad weather is not expected in the area through which the flight path 82 passes, i.e., in a case in which the condition of the flight path 82 is good, the controller 23 determines that flight is feasible (Yes) and proceeds to step S706.

In step S706, the controller 23 confirms with the aircraft 12 that flight is feasible. The controller 23 uses the identification information for the selected aircraft 12 to confirm with the aircraft 12 that flight is feasible. In correspondence with step S706, steps S610, S611, and S612 of FIG. 6 are performed. In step S610, the server apparatus 10 transmits information on flight feasibility confirmation to the aircraft 12. An operation plan is included in the information on flight feasibility confirmation. The operation plan includes information on the derived flight path 82, the flight time, the weather information, and the like. In step S611, the aircraft 12 outputs the operation plan and prompts for confirmation of flight feasibility. The controller 33 of the aircraft 12 controls the output interface 36, for example, to display and present to the pilot the operation plan and a message prompting for confirmation of flight feasibility. The pilot inputs, to the input interface 35, information indicating feasibility of the flight when judging that the flight is feasible based on the pilot's own piloting skills and inputs information indicating non-feasibility of the flight when judging that the flight is not feasible. Then, in step S612, the aircraft 12 transmits information to the server apparatus 10 indicating whether the flight is feasible.

In step S708 of FIG. 7, the controller 23 determines whether the flight feasibility has been confirmed. When information indicating that the flight is feasible has been received from the aircraft 12, the flight feasibility is confirmed (Yes), and the controller 23 proceeds to step S710. On the other hand, when information indicating that the flight is not feasible has been received from the aircraft 12, the flight feasibility is not confirmed (No), and the controller 23 returns to step S700 and performs steps S700 to S706 again. In step S700, the controller 23 derives a different flight path from the previous cycle.

In step S710, the controller 23 finalizes the flight path 82. The controller 23 then terminates the procedures of FIG. 7.

In step S704, in a case in which an area 83 of bad weather, such as a storm, is expected along the flight path 82, i.e., in a case in which the condition of the flight path 82 is poor, the controller 23 determines that flight is not feasible (No) and proceeds to step S711.

In step S711, the controller 23 refers to pilot information. The pilot information is information on the flight skills of the pilot of the aircraft 12, including flight history, training history, qualifications, and other information. The pilot information is stored in advance in the memory 22, for example, in association with the identification information for the aircraft 12. The controller 23 uses the identification information for the selected aircraft 12 to refer to the corresponding pilot information.

In step S712, the controller 23 derives an alternative destination 84 to replace the final destination 81 using any appropriate algorithm. The controller 23 derives, for example, an alternative destination 84 where no bad weather is occurring from the map information and the weather information. Candidate locations that have a ground surface shape and volume of space that allow the aircraft 12 to take off and land safely and that can be used as the alternative destination 84 are stored in advance in the memory 22 in association with the map information. Furthermore, each candidate location is associated in advance with a score indicating the difficulty of takeoff and landing. The difficulty of takeoff and landing is determined as appropriate according to the area of the ground surface available for takeoff and landing, the volume of surrounding space, and other such factors. The controller 23 scores, for example, the distance from the original flight path 82 for each candidate location near the flight path 82 and determines the location for which the sum of this score and a score for difficulty of takeoff and landing is lowest as the alternative destination 84. At this time, the controller 23 may weight the takeoff and landing difficulty score according to the pilot information. For example, the score may be multiplied by a coefficient that reduces the score in a case in which the pilot is highly skilled and increases the score in a case in which the pilot is less skilled. The skill of the pilot can, for example, be determined to be higher as the pilot has more flight hours or training hours. Alternatively, the skill of the pilot may be determined to be higher if the pilot has a predetermined qualification. As appropriate, the controller 23 also determines, as the alternative destination 84, a candidate location such that a vehicle 14 is present at a distance enabling the vehicle 14 to reach the candidate location by the time the aircraft 12 arrives. The arrival time of the aircraft 12 and the arrival time of the vehicle 14 are calculated using an appropriately set standard flight speed and travel speed, respectively, and the respective travel distances. For example, for each candidate location, the controller 23 calculates the estimated time of arrival of the aircraft 12 and the estimated time of arrival of the nearest vehicle 14 and determines the alternative destination 84 on the condition that the vehicle 14 can arrive by the arrival time of the aircraft 12.

In step S714, the controller 23 derives an alternative flight path 85 from the departure point 80 to the alternative destination 84 using any appropriate algorithm.

In step S716, the controller 23 confirms the flight feasibility with the aircraft 12. The controller 23 uses the identification information for the selected aircraft 12 to confirm with the aircraft 12 that flight is feasible. In correspondence with step S716, steps S610, S611, and S612 of FIG. 6 are performed. In step S610, the server apparatus 10 transmits the operation plan, including information on the alternative destination 84 and the alternative flight path 85, to the aircraft 12 as part of the information on flight feasibility confirmation. In step S611, the aircraft 12 outputs the operation plan and prompts for confirmation of flight feasibility. Once the pilot determines whether the flight is feasible based on the pilot's own piloting skills and inputs the result to the input interface 35, in step S612, the aircraft 12 transmits information indicating flight feasibility to the server apparatus 10.

In step S718 of FIG. 7, the controller 23 determines whether the flight feasibility has been confirmed. If information indicating flight feasibility has been received from the aircraft 12, the flight feasibility is confirmed (Yes), and the controller 23 proceeds to step S720. Conversely, if information indicating that the flight is not feasible has been received from the aircraft 12, the flight feasibility is not confirmed (No), and therefore the controller 23 returns to step S712 and performs steps S712 to S716 again. In step S712, the controller 23 derives a different alternative destination from the alternative destination derived in the previous cycle.

In step S720, the controller 23 derives a travel path 86 for the vehicle 14 from the alternative destination 84 to the final destination 81 using any appropriate algorithm. The controller 23 derives the travel path using, for example, map information and information on the road environment, traffic, and the like. The various information used to derive the travel path is stored in advance in the memory 22 or obtained from other servers via the communication interface 21 and is used by the controller 23. In a case in which the server apparatus 10 communicates with a plurality of vehicles 14, the controller 23 selects the vehicle 14 whose current position 801 is closest to the alternative destination 84 and derives the travel path 86.

In step S722, the controller 23 confirms the travel feasibility with the vehicle 14. The controller 23 uses the identification information for the selected vehicle 14 to confirm with the vehicle 14 that travel is feasible. In correspondence with step S722, steps S614, S615, and S616 of FIG. 6 are performed. In step S614, the server apparatus 10 transmits information on travel feasibility confirmation to the vehicle 14. An operation plan is included in the information on travel feasibility confirmation. The operation plan includes information on the derived travel path 86, the travel time, traffic conditions, and the like. In step S615, the vehicle 14 outputs the operation plan and prompts for confirmation of travel feasibility. The controller 43 of the vehicle 14 controls the output interface 46, for example, to display and present to the driver the operation plan and a message prompting for confirmation of travel feasibility. The driver inputs, to the input interface 35, information indicating feasibility of travel when judging that travel is feasible and inputs information indicating non-feasibility of travel when judging that travel is not feasible. Alternatively, in a case in which the vehicle 14 is operated automatically, the controller 43 may determine whether travel is feasible based on any appropriate algorithm, instead of step S615. Then, in step S616, the vehicle 14 transmits information to the server apparatus 10 indicating whether travel is feasible.

In step S724 of FIG. 7, the controller 23 determines whether the travel feasibility has been confirmed. If information indicating travel feasibility has been received from the vehicle 14, the travel feasibility is confirmed (Yes), and the controller 23 proceeds to step S726. Conversely, if information indicating that the travel is not feasible has been received from the vehicle 14, the travel feasibility is not confirmed (No), and therefore the controller 23 returns to step S712 and performs steps S712 to S722 again. In step S712, the controller 23 derives a different alternative destination from the alternative destination derived in the previous cycle.

In step S726, the controller 23 finalizes the alternative flight path 85 and the travel path 86. The controller 23 then terminates the procedures of FIG. 7.

Returning to FIG. 6, in step S618, the server apparatus transmits information on the operation plan to the terminal apparatus. The operation plan includes information on the flight path 82 from the departure point 80 to the final destination 81, or information on the alternative flight path 85 from the departure point 80 to the alternative destination 84 and the travel path 86 from the alternative destination 84 to the final destination 81; information on the selected aircraft 12, or the selected aircraft 12 and vehicle 14; and the like.

In step S620, the terminal apparatus 13 outputs the operation plan and accepts input of a reservation request from the passenger. The controller 53 controls the output interface 56 to display the operation plan and a reservation input screen. The passenger confirms the operation plan and inputs a request for reservation in a case in which the passenger wishes to board the aircraft 12, or the aircraft 12 and the vehicle 14, according to the operation plan. The controller 23 controls the touch panel or the like that forms the input interface 45 to accept the information inputted by the passenger.

In step S622, the terminal apparatus 13 transmits information on the reservation request to the server apparatus 10. The information on the reservation request includes passenger information. The passenger information includes the name, address, date of birth, user registration number, user account information, and the like for identifying the passenger. The passenger information may be stored in advance in the memory 52 as user registration information or may be inputted by the passenger along with input of the reservation request to the terminal apparatus 13. The server apparatus 10 receives the information transmitted from the terminal apparatus 13.

In step S624, the server apparatus 10 confirms the reservation. The controller 23 excludes the aircraft 12, or the aircraft 12 and the vehicle 14, incorporated into the operation plan from the operation plan corresponding to a request from another terminal apparatus 13.

In step S626, the server apparatus 10 transmits a flight instruction to the aircraft 12. The flight instruction includes the information necessary to fly according to the flight path 82, or the alternative flight path 85, in the operation plan for which the reservation has been confirmed. Information on a flight path 88 from the current position 800 of the aircraft 12 to the departure point 80 is also included in the flight instruction. The aircraft 12 receives the information transmitted from the server apparatus 10.

In step S628, the server apparatus 10 transmits a travel instruction to the vehicle 14. The travel instruction includes the information necessary to travel according to the travel path 86 in the operation plan for which the reservation has been confirmed. Information on a travel path 89 from the current position 801 of the vehicle 14 to the alternative destination 84 is also included in the travel instruction. The vehicle 14 receives the information transmitted from the server apparatus 10. In this way, the dispatch process is executed. In a case in which the flight path 82 is flown by the aircraft 12, the travel path 86 is not included in the operation plan, and hence step S628 is not performed.

In step S629, the server apparatus 10 transmits operation guidance information to the terminal apparatus 13. In the case of operation including flight along the flight path 82, the operation guidance information includes information such as the time of departure of the aircraft 12 from the departure point 80, the flight path 82, and the estimated time of arrival at the final destination 81. Alternatively, in the case of operation including flight along the alternative flight path 85, the operation guidance information includes information such as the time of departure of the aircraft 12 from the departure point 80, the alternative flight path 85, the estimated time of arrival at the alternative destination 84, the estimated time of departure of the vehicle 14 from the alternative destination 84, and the estimated time of arrival at the final destination 81. The controller 23 derives this information based on the current position 800 of the aircraft 12, the scheduled flight speed, and the weather information; the current position 801 of the vehicle 14, the scheduled travel speed, and information on traffic conditions; and the like. The terminal apparatus 13 receives the information transmitted from the server apparatus.

In step S630, the terminal apparatus 13 outputs operation guidance information. The controller 53 displays and presents the operation guidance to the passenger. This enables passengers to learn the operation plan and travel to the departure point 80 by the scheduled departure time.

In step S632, the aircraft 12 flies based on the flight instruction from the server apparatus 10. The aircraft 12 flies from the current position 800 to the departure point 80, and once the passengers board at the departure point 80, the aircraft flies to the final destination 81 according to the flight path 82 or to the alternative destination 84 according to the alternative flight path 85. The aircraft 12 outputs the information necessary for flight using a display or the like to present the information to the pilot, who pilots the aircraft 12.

In step S634, in a case in which a travel instruction has been received from the server apparatus 10, the vehicle 14 travels based on the travel instruction. The vehicle 14 travels from the current position 801 to the alternative destination 84, and once the passengers board at the alternative destination 84, the vehicle 14 travels to the final destination 81 along the travel path 86. The vehicle 14 outputs information necessary for travel using a display or the like to present the information to the driver, who drives the vehicle 14. Alternatively, the vehicle 14 travels according to the travel instruction by automatic operation.

In step S636, the server apparatus 10 executes a process to grant an incentive to the passenger. The server apparatus 10 uses the information on the user account included in the passenger information to execute the process of granting an incentive, such as points or coupons, to the user account of the passenger. Such an incentive may be applied towards the fare the next time the aircraft 12 or vehicle 14 is boarded. The controller 23 grants an incentive of any fixed amount when, for example, the boarding history of the passenger onto the aircraft 12 or the vehicle 14 reaches a standard number of times. In a case in which the aircraft 12 was unable to fly on the original flight path 82, the controller 23 may execute a process to grant the passenger an incentive in an amount corresponding to the difference between the arrival time in a case in which the aircraft 12 flies to the final destination 81 along the flight path 82 and the arrival time in a case of flying to the alternative destination 84 along the alternative flight path 85 and traveling via the vehicle 14 to the final destination 81.

In step S638, the server apparatus 10 transmits an incentive granting notification to the terminal apparatus 13. The incentive granting notification includes information such as the amount of incentive to be granted, the expiration date, and the method of use. The terminal apparatus 13 receives the information transmitted from the server apparatus 10.

In step S640, the terminal apparatus 13 outputs the incentive granting notification. The controller 53 displays the incentive granting notification to present the notification to the passenger. This motivates the passenger to use the aircraft 12 or the vehicle 14 again. In addition, the fact that the delay due to the use of the alternative flight path 85 and the travel path 86 is compensated for with the incentive can improve passenger satisfaction.

In step S642, the server apparatus 10 stores passenger information and a history of boarding the aircraft 12 and the vehicle 14 as a passenger record. Such a passenger record can be referred to for granting an incentive the next time or for providing information about the travel business.

The above procedures enable a passenger to travel from the departure point 80 to the final destination 81. In a case in which the condition of the initial flight path 82 of the aircraft 12 is not good, such as when passing through an area 83 of bad weather, the passenger can fly in the aircraft 12 to the alternative destination 84 along the alternative flight path 85 and can reach the final destination 81 from the alternative destination 84 in the vehicle 14. For providers of transport services using passenger transport means such as the aircraft 12 and the vehicle 14, opportunity losses, such as refunds due to cancellations, can be avoided. The operational efficiency of the passenger transport means can thus be improved.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A server apparatus comprising:
a communication interface; and
a controller configured to communicate using the communication interface, wherein
the controller instructs an aircraft to fly along a flight path for the aircraft to transport a passenger from a departure point to a final destination when a condition of the flight path is good,
the controller instructs the aircraft to fly along an alternative flight path to an alternative destination and executes a dispatch process to dispatch a vehicle to transport the passenger from the alternative destination to the final destination when the condition of the flight path is poor, and
the controller determines the alternative destination based on information on flight skills of a pilot of the aircraft.

2. The server apparatus according to claim 1, wherein the controller determines the condition of the flight path based on weather information for the flight path.

3. The server apparatus according to claim 1, wherein the controller determines the alternative destination from among a plurality of candidate locations, based on a distance from the flight path for each candidate location and difficulty of takeoff and landing for each candidate location.

4. The server apparatus according to claim 1, wherein the controller transmits information on the alternative flight path to the aircraft and determines the alternative destination on a condition that information indicating that the flight along the alternative flight path is feasible for the pilot is received from the aircraft.

5. The server apparatus according to claim 1, wherein the controller determines the alternative destination on a condition that the vehicle is capable of arriving at the alternative destination by a time at which the aircraft arrives at the alternative destination.

6. The server apparatus according to claim 1, wherein the controller executes a process to grant an incentive to the passenger according to a difference between an arrival time at the final destination in a case of using the flight path and an arrival time at the final destination in a case of using the alternative flight path.

7. The server apparatus according to claim 1, wherein the controller receives information on the departure point and the final destination from a terminal apparatus used by the passenger and determines the flight path or determines the alternative flight path and executes the dispatch process.

8. A system comprising a server apparatus, an aircraft, and a vehicle configured to communicate with each other, wherein
the server apparatus instructs the aircraft to fly along a flight path for the aircraft to transport a passenger from a departure point to a final destination when a condition of the flight path is good, instructs the aircraft to fly along an alternative flight path to an alternative destination and executes a dispatch process to dispatch a vehicle to transport the passenger from the alternative destination to the final destination when the condition of the flight path is poor, and determines the alternative destination based on information on flight skills of a pilot of the aircraft,
the aircraft flies according to instruction from the server apparatus, and
the vehicle travels based on the dispatch process.

9. The system according to claim 8, wherein the server apparatus determines the condition of the flight path based on weather information for the flight path.

10. The system according to claim 8, wherein the server apparatus determines the alternative destination from among a plurality of candidate locations, based on a distance from the flight path for each candidate location and difficulty of takeoff and landing for each candidate location.

11. The system according to claim 8, wherein the server apparatus transmits information on the alternative flight path to the aircraft and determines the alternative destination on a condition that information indicating that the flight along the alternative flight path is feasible for the pilot is received from the aircraft.

12. The system according to claim 8, wherein the server apparatus determines the alternative destination on a condition that the vehicle is capable of arriving at the alternative destination by a time at which the aircraft arrives at the alternative destination.

13. The system according to claim 8, wherein the server apparatus executes a process to grant an incentive to the passenger according to a difference between an arrival time at the final destination in a case of using the flight path and an arrival time at the final destination in a case of using the alternative flight path.

14. The system according to claim 8, wherein the server apparatus receives information on the departure point and the final destination from a terminal apparatus used by the passenger and determines the flight path or determines the alternative flight path and executes the dispatch process.

15. An operating method of a system comprising a server apparatus, an aircraft, and a vehicle configured to communicate with each other, the operating method comprising:
instructing, by the server apparatus, the aircraft to fly along a flight path for the aircraft to transport a passenger from a departure point to a final destination when a condition of the flight path is good, instructing the aircraft to fly along an alternative flight path to an alternative destination and executing a dispatch process to dispatch a vehicle to transport the passenger from the alternative destination to the final destination when the condition of the flight path is poor, and determining the alternative destination based on information on flight skills of a pilot of the aircraft;
flying, by the aircraft, according to instruction from the server apparatus; and
traveling, by the vehicle, based on the dispatch process.

16. The operating method according to claim 15, wherein the server apparatus determines the condition of the flight path based on weather information for the flight path.

17. The operating method according to claim 15, wherein the server apparatus determines the alternative destination from among a plurality of candidate locations, based on a distance from the flight path for each candidate location and difficulty of takeoff and landing for each candidate location.

18. The operating method according to claim 15, wherein the server apparatus transmits information on the alternative flight path to the aircraft and determines the alternative destination on a condition that information indicating that the flight along the alternative flight path is feasible for the pilot is received from the aircraft.

19. The operating method according to claim 15, wherein the server apparatus determines the alternative destination on a condition that the vehicle is capable of arriving at the alternative destination by a time at which the aircraft arrives at the alternative destination.

20. The operating method according to claim 15, wherein the server apparatus executes a process to grant an incentive to the passenger according to a difference between an arrival time at the final destination in a case of using the flight path and an arrival time at the final destination in a case of using the alternative flight path.

\* \* \* \* \*